United States Patent [19]

Takakusaki et al.

[11] Patent Number: 4,929,450
[45] Date of Patent: May 29, 1990

[54] DELIVERY APPARATUS IN MACHINE FOR PREPARING PLASTIC HOLLOW VESSELS

[75] Inventors: Nobuyuki Takakusaki, Yokohama; Yohji Mizutani; Nobuhiro Kishida, both of Tokyo; Manabu Hosokawa, Kawasaki, all of Japan

[73] Assignee: Toyo Seikan Kaisha, Ltd., Tokyo, Japan

[21] Appl. No.: 144,717

[22] Filed: Jan. 14, 1988

Related U.S. Application Data

[63] Continuation-in-part of Ser. No. 82,466, Aug. 7, 1987, Pat. No. 4,790,741.

[51] Int. Cl.$^5$ .............................................. B29C 49/36
[52] U.S. Cl. .................................... 425/526; 425/540
[58] Field of Search ........................ 425/526, 538, 540

[56] References Cited

U.S. PATENT DOCUMENTS

| | | | |
|---|---|---|---|
| 2,715,751 | 8/1955 | Weber | 264/538 |
| 3,599,280 | 8/1971 | Rosenkranz | 425/526 |
| 4,214,860 | 7/1980 | Kleimenhagen et al. | 425/526 |
| 4,233,010 | 11/1980 | Suzuki | 425/540 |
| 4,299,549 | 11/1981 | Suzuki et al. | 425/526 |
| 4,344,749 | 8/1982 | Fritz et al. | 264/538 |
| 4,355,968 | 10/1982 | Lagoutte et al. | 425/526 |
| 4,479,772 | 10/1984 | Kleimenhagen | 425/526 |
| 4,505,664 | 3/1985 | Craig | 425/526 |
| 4,592,720 | 6/1986 | Dugan et al. | 425/526 |

*Primary Examiner*—Willard Hoag
*Attorney, Agent, or Firm*—Sughrue, Mion, Zinn, Macpeak & Seas

[57] ABSTRACT

In a delivery apparatus in a machine for preparing hollow vessels by delivering mandrels supporting thereon preforms and vessels through a preform-heating zone and a draw-blow-forming zone, the downward movement of a mandrel-clamping mechanism is utilized for insertion of a preform into the mandrel and the rising movement of the clamping mechanism is utilized for withdrawal of a formed vessel. By this arrangement, insertion and fixation of preforms into mandrels and withdrawal of formed vessels from mandrels can be performed continuously, assuredly and smoothly in one apparatus while saving the waste in the blow-forming operation. If the operation of reversing the clamping mechanism is added, any particular device need not be disposed for reversing preforms.

3 Claims, 10 Drawing Sheets

DELIVERY APPARATUS IN MACHINE FOR PREPARING PLASTIC HOLLOW VESSELS

This application is a continuation-in-part application of the application Ser. No. 82466, filed on Aug. 7, 1987, now U.S. Pat. No. 4,790,741.

BACKGROUND OF THE INVENTION (1) Field of the Invention

The present invention relates to a delivery apparatus in a machine for preparing plastic hollow vessels. More particularly, in a machine for preparing a plastic hollow vessel by heating a plastic preform at a drawing temperature and draw-blow-forming the heated preform in a split mold, the present invention relates to an apparatus for performing the delivery of the preform and vessel smoothly (2) Description of the Prior Art A biaxially draw-blow-formed vessel of a thermoplastic polyester such as polyethylene terephthalate (PET) has excellent transparency and surface gloss and has high impact resistance, rigidity and gas-barrier property required for a bottle, and therefore, this vessel is widely used for packaging various liquids.

In preparing a biaxially draw-blow-formed vessel of this type, there is adopted a process in which a bottomed preform is formed by injection molding of a plastic material, the bottomed preform is heated at a drawing temperature and the preform is draw-blow-formed in a split mold.

Japanese Patent Publication No. 45524/86 discloses an apparatus for preparing drawn plastic hollow vessels, which comprises;

- a mandrel for supporting a preform composed of a plastic material and a hollow vessel formed from the preform;
- a loading zone for loading the preform on the mandrel;
- a preheating zone having a turret comprising a plurality of supporting seats for supporting the mandrel around the periphery thereof and a heating mechanism arranged along the periphery of the turret to heat the preform loaded on the mandrel;
- a blow-forming zone comprising a rotary member having, arranged along the periphery thereof, a plurality of openable and closable blow-forming molds and mandrel-supporting members corresponding to said molds;
- a delivery zone for delivering the preheated preform-loaded mandrel to the blow-forming zone from the preheating zone;
- a withdrawal zone for withdrawing the blow-formed vessel-loaded mandrel from the blow-forming zone; and
- an endless mandrel-delivering path which passes through the loading zone, the preheating zone, the delivery zone, the blow-forming zone and the withdrawal zone in the recited order.

In a plastic hollow vessel-preparing apparatus of this type, the operation of inserting the preform into the mandrel and fixing the preform to the mandrel and the operation of withdrawing the formed vessel from the mandrel are necessary and indispensable.

Furthermore, since support rings are formed on the neck portions of the preform and vessel for supporting them, the preform and hollow vessel are delivered in the state where the mouth portions are located on the upper side. Accordingly, prior to the above-mentioned inserting and fixing operation, the operation of turning over the preform should be performed, and after the above-mentioned withdrawal operation, the operation of turning over the vessel should be performed.

In the above-mentioned conventional apparatus, since the operation of inserting and fixing the preform and the operation of withdrawing the formed vessel are carried out by different mechanisms, the structure of the apparatus is complicated, and if mechanisms for performing the operations of turning over the preform and the formed vessel are attached to the apparatus, the structure of the apparatus becomes more complicated

SUMMARY OF THE INVENTION

It is therefore a primary object of the present invention to provide a delivery apparatus in which the operation of inserting a preform into a mandrel and fixing the preform to the mandrel and the operation of withdrawing a formed vessel from the mandrel can be performed continuously, smoothly and assuredly in the single apparatus.

Another object of the present invention is to provide a delivery apparatus in which the operation of turning over the preform for insertion and fixation of the preform into the mandrel can be performed simultaneously with the above-mentioned operations.

In accordance with the present invention, there is provided a delivery apparatus in a machine for preparing drawn plastic hollow vessels, said delivery apparatus comprising:

- a mandrel for supporting a preform composed of a plastic material and a hollow vessel formed from the preform;
- a loading zone for loading the preform on the mandrel;
- a preheating zone having a turret comprising a plurality of supporting seats for supporting the madrel around the periphery thereof and a heating mechanism arranged along the periphery of the turret to heat the preform loaded on the mandrel;
- a blow-forming zone comprising a rotary member having, arranged along the periphery thereof, a plurality of openable and closable blow-forming molds and mandrel-supporting members corresponding to said molds;
- a delivery zone for delivering the preheated preform-loaded mandrel to the blow-forming zone from the preheating zone;
- a withdrawal zone for withdrawing the blow-formed vessel-loaded mandrel from the blow-forming zone; and
- an endless mandrel-delivering path which passes through the loading zone, the preheating zone, the delivery zone, the blow-forming zone and the withdrawal zone in the reacted order;
- wherein a preform supply mechanism for supplying the preform, a preform-loading and vessel-unloading mechanism for pushing the preform coming from the supply mechanism into the mandrel to fix the preform thereto and withdrawing the vessel from the vessel-loaded mandrel supplied from the withdrawal zone, a preform delivery mechanism for delivering the preform-loaded mandrel to the preheating zone and a vessel delivery mechanism for delivering the vessel withdrawn from the mandrel to the outside of the apparatus from the loading and unloading mechanism are arranged in the loading zone;

said preform-loading and vessel-unloading mechanism comprises a first rotary member, a clamping mechanism having grippers arranged equidistantly along the periphery of said first rotary member to hold the neck portions of the preform and vessel, an opening and closing mechanism for opening and closing the grippers of the clamping mechanism, a reciprocating drive mechanism for driving the clamping mechanism reciprocatively in the axial direction of said first rotary member, a second rotary member arranged coaxially with said first rotary member below said first rotary member and spaced therefrom in the axial direction, and mandrel-supporting seats arranged equidistantly along the periphery of the second rotary members and located at positions coaxial with the positions for gripping the neck portions of the preform and vessel in the clamping mechanism;

the preform supply mechanism, the preform delivery mechanism, the vessel withdrawal zone and the vessel delivery mechanism are arranged in the recited order in the rotation direction of the loading and unloading mechanism along the periphery of the loading and unloading mechanism; and the opening and closing mechanism and reciprocating drive mechanism for the clamping mechanism are combined with each other so that;

at the contact point between the preform supply mechanism and the loading and unloading mechanism or in the vicinity thereof, the grippers are closed to hold the preform;

in the region of from the contact point between the preform supply mechanism and the loading and unloading mechanism to the contact point between the preform delivery mechanism and the loading and unloading mechanism, the movement for insertion of the preform into the mandrel is carried out;

at the contact point between the preform delivery mechanism and the loading and unloading mechanism or in the vicinity thereof, the grippers are opened to release the preform;

at the contact point between the vessel withdrawal zone and the loading and unloading mechanism or in the vicinity thereof, the grippers are closed to hold the neck portion of the vessel;

in the region of from the contact point between the vessel withdrawal zone and the loading and unloading mechanism to the contact point between the vessel delivery mechanism to the contact point between the vessel delivery mechanism and the loading and unloading mechanism, the movement for the withdrawal of the vessel is carried out;

at the contact point between the vessel delivery mechanism and the loading and unloading mechanism or in the vicinity thereof, the grippers are opened to release the vessel; and in the region of from the contact point between the vessel delivery mechanism and the loading and unloading mechanism to the contact point between the preform supply mechanism and the loading and unloading mechanism, the half-turn movement of the clamping mechanism is carried out.

Furthermore, in accordance with the present invention, there is provided a delivery apparatus as set forth above, wherein the loading and unloading mechanism comprises a rotating drive mechanism for rotating and driving the clamping mechanism at the position for the attachement to the rotary member, and said rotating drive mechanism is combined with the opening and closing mechanism and reciprocating drive mechanism for the clamping mechanism so that in the region of from the contact point between the preform supply mechanism and the loading and unloading mechanism to the contact point between the preform delivery mechanism and the loading and unloading mechanism, the half-turn movement of the clamping mechanism and the movement for insertion of the preform into the mandrel are carried out, and in the region of from the contact point between the vessel delivery mechanism and the loading and unloading mechanism to the contact point between the preform supply mechanism and the loading and unloading mechanism, the half-turn movement of the clamping mechanism is carried out Moreover, in accordance with the present invention, there is provided a delivery-apparatus as set forth above, wherein said vessel delivery mechanism comprises a vessel-reversing mechanism and a vessel-conveying mechanism; said vessel-reversing mechanism comprises a rotary member, a clamping mechanism having grippers arranged equidistantly along the periphery of the rotary member to hold the lower part of the neck portion of the vessel, an opening and closing mechanism for opening and closing the grippers of said clamping mechanism and a rotating drive mechanism for rotating and driving said clamping mechanism at the position for the attachment to the rotary member; and in the vessel-reversing mechanism, the opening and closing mechanism and the rotating drive mechanism are combined with each other so that at the contact point between the loading and unloading mechanism and the vessel-reversing mechanism or in the vicinity thereof, the grippers are closed to hold the lower part of the neck portion of the vessel, in the region of from the contact point between the loading and unloading mechanism and the vessel-reversing mechanism to the contact point between the vessel-reversing mechanism and the vessel-conveying mechanism the movement of $\frac{1}{2}$ to $\frac{1}{4}$ rotation of the clamping mechanism and the sequential upright setting or sidelong laying of the vessel are carried out, and at the contact point between the vessel-reversing mechanism and the vessel-conveying mechanism or in the vicinity thereof, the clippers are opened to release the vessel to the vessel-conveying mechanism.

BRIEF DESCRIPTION OF THE DRAWINGS

FIG. 2-B is a side view showing the preform

FIG. 2-C is a side view showing the mandrel in which the preform is inserted.

Figure 1:
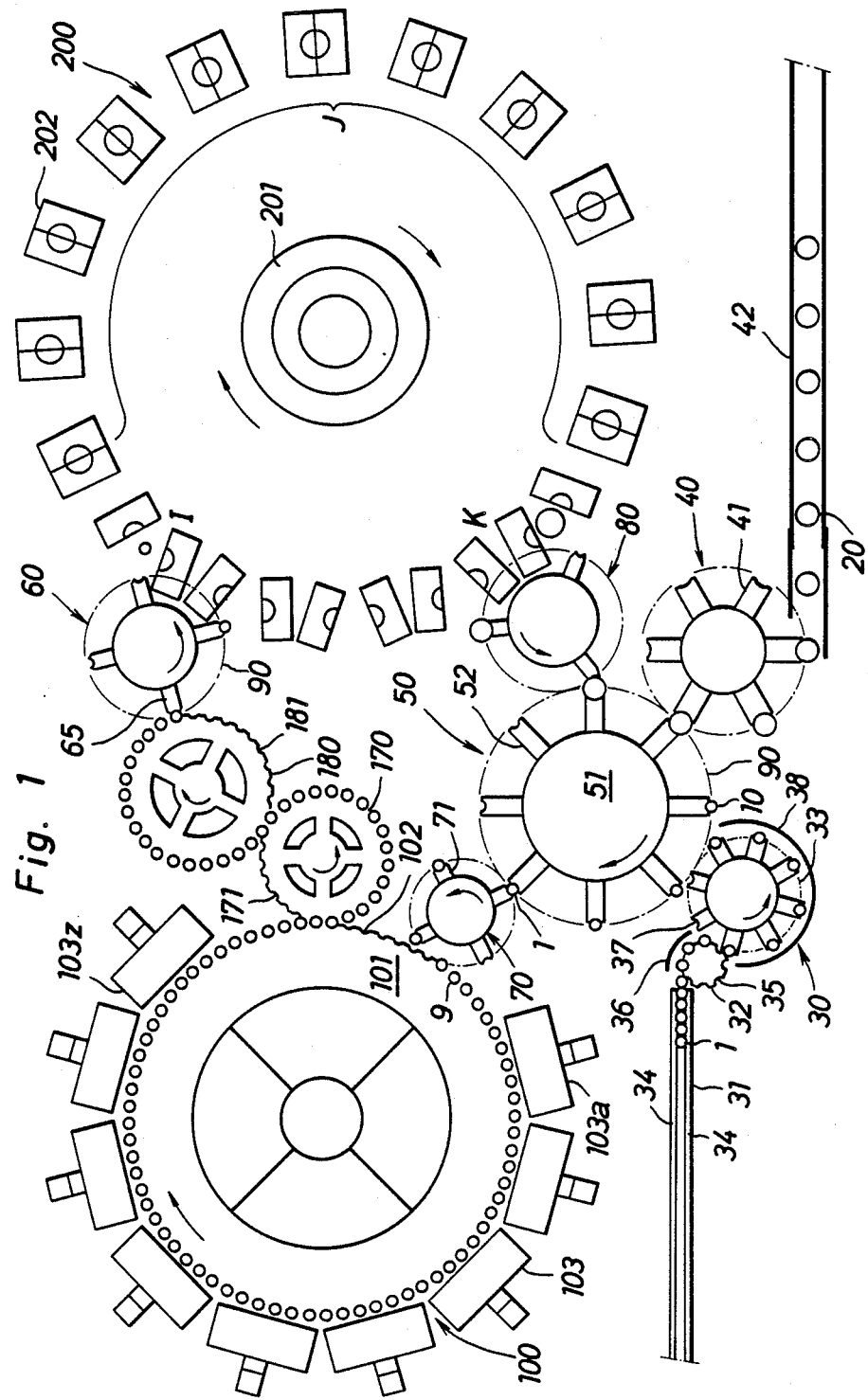
FIG. 1 is a top view illustrating the entire arrangement of the apparatus of the present invention.

In the drawings, reference numerals represent the following members and mechanisms.

1: preform, 10: mandrel, 30: supply mechanism, 100: preheating mechanism, 200: forming mechanism, 20: formed hollow vessel 50: loading and unloading mechanism, 51: first rotary member, 52: clamping mechanism, 53: holding notch, 54: gripper, 57: bracket, 58: vertically moving member, 59: second rotary member, 313: cam for controlling the vertical movement, 314: cam for controlling the rotation of the bracket, 315: cam for controlling opening and closing of grippers.

DETAILED DESCRIPTION OF THE PREFERRED EMBODIMENTS

In the apparatus of the present invention, as well as in the known apparatus, mandrels for supporting a preform and a formed vessel during and after the draw-blow-forming operation are moved along an endless movement path which passes through a preheating zone for preheating the preform for the draw-blow-forming operation and a draw-blow-forming zone, and in the draw-blow-forming zone, the draw-blow-forming of the preform by the cooperation of a drawing rod inserted into the preform and a fluid blown into the preform under a high pressure in molds, which are arranged radially relatively a rotary member, so that they can be opened and closed.

According to the present invention, the operation of inserting and fixing the preform into the mandrel and the operation of withdrawing the formed vessel from the mandrel can be performed continuously, smoothly and assuredly in the single delivery apparatus. In this delivery apparatus, also the operation of turning over the preform, which is delivered in the upright state, for insertion into the mandrel can be simultaneously performed.

In the delivery apparatus of the present invention, a loading and unloading mechanism for pushing the mandrel coming from the supply mechanism into the mandrel to fix the preform to the mandrel and withdrawing the formed vessel from the vessel-loaded mandrel supplied from a withdrawal zone for withdrawing the formed vessel from the blow-forming zone is arranged at the center, and around the periphery of the loading and unloading mechanism, (1) a preform supply mechanism, (2) a preform delivery mechanism for delivering the preform-loaded mandrel to the preheating zone, (3) a vessel withdrawal mechanism for withdrawing the formed vessel-loaded mandrel from the openable and closable mold and (4) a vessel delivery mechanism for delivering the vessel withdrawn from the mandrel to the outside of the apparatus are arranged in the recited order in the rotation direction of the loading and unloading mechanism.

The loading and unloading mechanism comprises (a) a first rotary member having mandrel-supporting seats arranged coaxially with each other and (b) a second rotary member having a clamping mechanism, and the loading and unloading mechanism is disposed so that the mandrel on the mandrel-supporting seat and the neck portions of the preform and vessel in the clamping mechanism are located on one axial line (vertical axis). The clamping mechanism comprises (i) grippers for holding the neck portions of the preform and vessel and (ii) an opening and closing mechanism for opening and closing said grippers, preferably together with (iii) a rotating drive mechanism for rotating and driving the clamping mechanism at the position for attachment to the rotary member. The above-mentioned opening and closing mechanism for the clamping mechanism is combined with a reciprocating drive mechanism for the clamping mechanism so that at the contact point between the preform supply mechanism or in the vicinity thereof, the grippers are closed to hold the preform; in the region of from the contact point between the preform supply mechanism and the loading and unloading mechanism to the contact point between the preform delivery mechanism and the loading and unloading mechanism, the movement (downward movement) of the grippers for insertion of the preform into the mandrel is carried out; at the contact point between the preform delivery mechanism and the loading and unloading mechanism or in the vicinity thereof, the grippers are opened to release the preform; at the contact point between the vessel withdrawal zone and the loading and unloading mechanism or in the vicinity thereof, the grippers are closed to hold the neck portion of the vessel; in the region of from the contact between the vessel withdrawal zone and the loading and unloading mechanism to the contact point between the vessel delivery mechanism and the loading and unloading mechanism, the movement (upward movement) of the grippers for withdrawal of the vessel is carried out; and at the contact point between the vessel deliver mechanism and the loading and unloading mechanism or in the vicinity thereof, the grippers are opened to release the vessel.

According to the present invention, the preform supplied by the preform supply mechanism (1) is inserted into the mandrel by the loading and unloading mechanism and is fed into the preheating zone by the preform delivery mechanism (2), and the vessel-loaded mandrel withdrawn from the openable and closable mold and fed by the vessel withdrawal mechanism 3 is divided into the vessel and the mandrel by the loading and unloading mechanism and the vessel is delivered to the outside of the apparatus by the vessel delivery mechanism 4 while the preform is inserted again into the empty mandrel. The foregoing operations are conducted repeatedly.

In the case where the rotating drive mechanism (iii) is arranged in the clamping mechanism according to the preferred embodiment of the present invention, this rotating drive mechanism is combined with the opening and closing mechanism and rotating drive mechanism of the clamping mechanism so that in the region of from the contact point between the preform supply mechanism and the loading and unloading mechanism to the contact between the preform delivery mechanism and the loading and unloading mechanism, the half-turn movement of the clamping mechanism and the movement for insertion of the preform into the mandrel are carried out, and in the region of from the contact point between the vessel delivery mechanism and the loading and unloading mechanism, the half-turn movement of the clamping mechanism is carried out By this arrangement, the preform supplied in the upright set state where the neck portion is located above is inserted in the reversed state into the mandrel Accordingly, a special member or mechanism for reversing the preform need not be disposed but can be omitted.

Although the vessel released from the loading and unloading mechanism is in the reversed state where the neck portion is located below, the operation of setting the vessel upright is similarly performed by the vessel-reversing mechanism as the operation of reversing the preform.

The present invention will now be described in detail with reference to the accompanying drawings.

Referring to FIG. 1, which is a top view illustrating the entire arrangement of the apparatus of the present invention, the apparatus of the present invention comprises, as main members, a preform supply mechanism. 30 (described in detail hereinafter) for supplying a preform 1 composed of a plastic material to load the preform 1 on a mandrel 10, a preheating mechanism 100 for preheating the preform 1 on the mandrel at a drawing temperature, a forming mechanism 200 for draw-blow-forming the preheated preform in a mold and a vessel delivery mechanism 40 (described in detail hereinafter) for unloading a formed vessel 20 from the mandrel 10 and delivering the formed vessel to the outside of the apparatus.

A turret-shaped loading and unloading mechanism 50 for loading the preform 1 on the mandrel 10 and unloading the hollow vessel 20 from the mandrel 10 is arranged between the preform-introducing side of the preheating mechanism 100 and the hollow vessel-discharging side of the forming mechanism 200. A transfer mechanism 60 for delivering the preheated preform into the mold in the forming mechanism 200 is arranged between the preform-discharging side of the preheating mechanism 100 and the preform-introducing side of the forming mechanism 200. A delivery mechanism 70 for the preform-loaded mandrel is arranged between the turret-shaped loading and unloading mechanism 50 and the preheating mechanism 100, and a withdrawal mechanism 80 for the hollow vessel-loaded mandrel is arranged between the forming mechanism 200 and the turret-shaped loading and unloading mechanism 50. It will be understood that an endless delivery path 90 for the mandrel 10 is laid out to pass through the turret-shaped loading and unloading mechanism 50, the preform delivery mechanism 70, the preheating mechanism 100, the transfer mechanism 60, the forming mechanism 200 and the vessel withdrawal mechanism 80 in the recited order. Incidentally, turrets 170 and 180 are disposed between the preheating mechanism 100 and the transfer mechanism 60 to uniformalize the temperature of the uniform. The functions of the turrets 170 and 180 will be described hereinafter.

Figure 2:
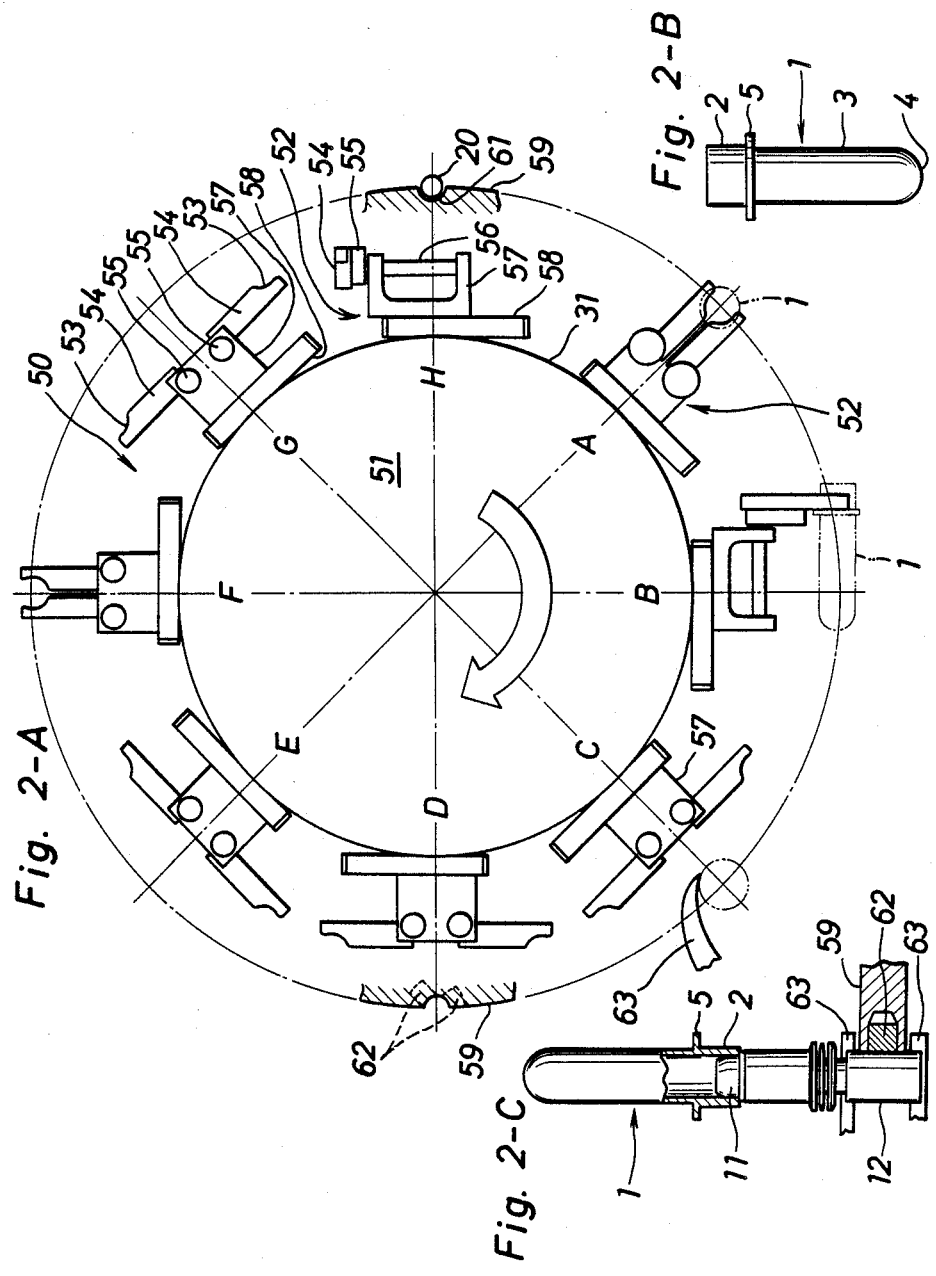
FIG. 2-A is an enlarged top view showing a loading and unloading mechanism for loading a preform on a mandrel and unloading a formed vessel therefrom.

Referring to FIG. 2-B illustrating the preform 1, this preform 1 comprises a cylindrical neck portion 2 having a size and shape corresponding to those of the final vessel, a cylindrical barrel portion 3, a closed bottom 4 and a supporting ring 5. The supporting ring 5 is arranged just below the neck portion 2.

Figure 3:
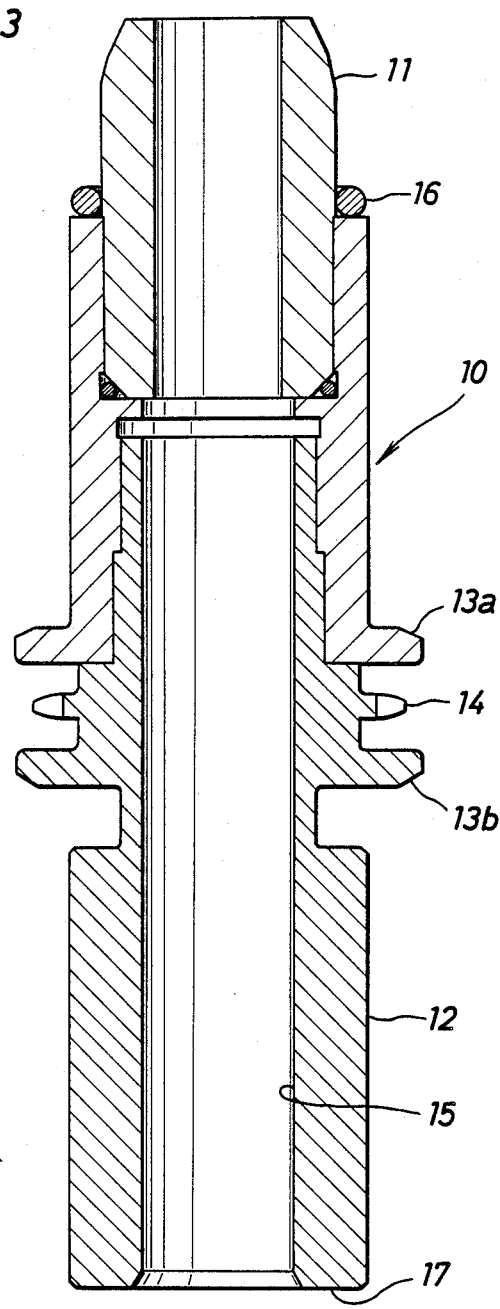
FIG. 3 is an enlarged side view showing the section of the mandrel

The mandrel 10 has, on the top end in FIG. 3, an insertion top end portion 11 to be inserted into the neck portion of the preform 1 and the mandrel 10 has, in the lower portion in FIG. 3, a cylindrical shaft portion 12. A gear 14 is arranged between two flanges 13a and 13b in the central portion of the mandrel 10, and the gear 14 is serviceable for rotating the mandrel 10 in the preheating mechanism A hollow path 15 is formed at the center of the mandrel 10 and acts as a space for the vertical movement of a drawing rod and also as a passage for a fluid for the draw-blow-forming operation in the forming mechanism. A sealing 0-ring 16 is arranged on the lower end of the outer circumference of the insertion top end portion 11 for the sealing engagement with the top end of the neck portion 2 of the preform, and an engaging surface 17 to be engaged with a blow-forming lift member (described in detail hereinafter) of the forming mechanism is formed on the lower end of the cylindrical shaft portion 12.

Referring to FIG. 1 again, the preform mechanism 30 comprises a supply chute 31, a small turret 32 and a large turret 33. The chute 31 has confronting slide plates 34 separated from each other by a distance (d) larger than the diameter of the cylindrical barrel portion 3 of the preform 1 but smaller than the diameter of the supporting ring 5, and the preform 1 in the upright state is supplied to the small turret 32 in such a manner that the supporting ring 5 of the preform 1 passes above the confronting slide plates 34. The small turret 32 has a preform-receiving recess 35 having a size equal to the above-mentioned distance (d). The preform 1 is supported on the recess 35 by cooperation with a guide 36 and in this state, the small turret 36 is rotated clockwise in the drawings The large turrent 33, like the small turret 32, has a preform-receiving recess 37, supports the preform received from the small turret 32 and is rotated counterclockwise along a guide 38. The peripheral speed of the large turret 33 is synchronous with the peripheral speed of the small turret 32 at the contact point with the small turret 32 or in the vicinity thereof and is synchronous with the peripheral speed of the loading and unloading mechanism 50 at the contact point with the loading and unloading mechanism 50 or in the vicinity thereof.

The loading and unloading mechanism 50 comprises a first rotary member 51 driven and rotated clockwise and a plurality (6 in the drawings) of clamping mechanisms arranged equidistantly along the periphery of the rotary member 51. Referring to FIG. 2-A which is an enlarged view of the loading and unloading mechanism 50, the clamping mechanism 52 comprising a pair of openable and closable grippers 54 having a substantially quandrantal notch 53 on one top end, opening and closing pinions 55 arranged on the other ends of the grippers 54, a gripper-driving shaft 56, a bracket 57 rotatably supporting the shaft 56 and a lift member 58 for vertically moving the bracket 57.

A mandrel-supporting second rotary member 59 having a diameter larger than that of the first rotary member 51 is arranged below the rotary member 51 coaxially therewith, and mandrel-supporting seats 61 corresponding to the clamping mechanisms 52 are arranged around the rotary member 59. While the grippers 54 are closed, the central axis of the preform-supporting recess 53 and the central axis of the mandrel-supporting seat 61 are located on one vertical line. A magnet 62 is arranged in the mandrel-supporting seat 61 (see FIG. 2-C) to attract the shaft portion 12 of the mandrel 10 and hold the mandrel on the seat 61.

Figure 4:
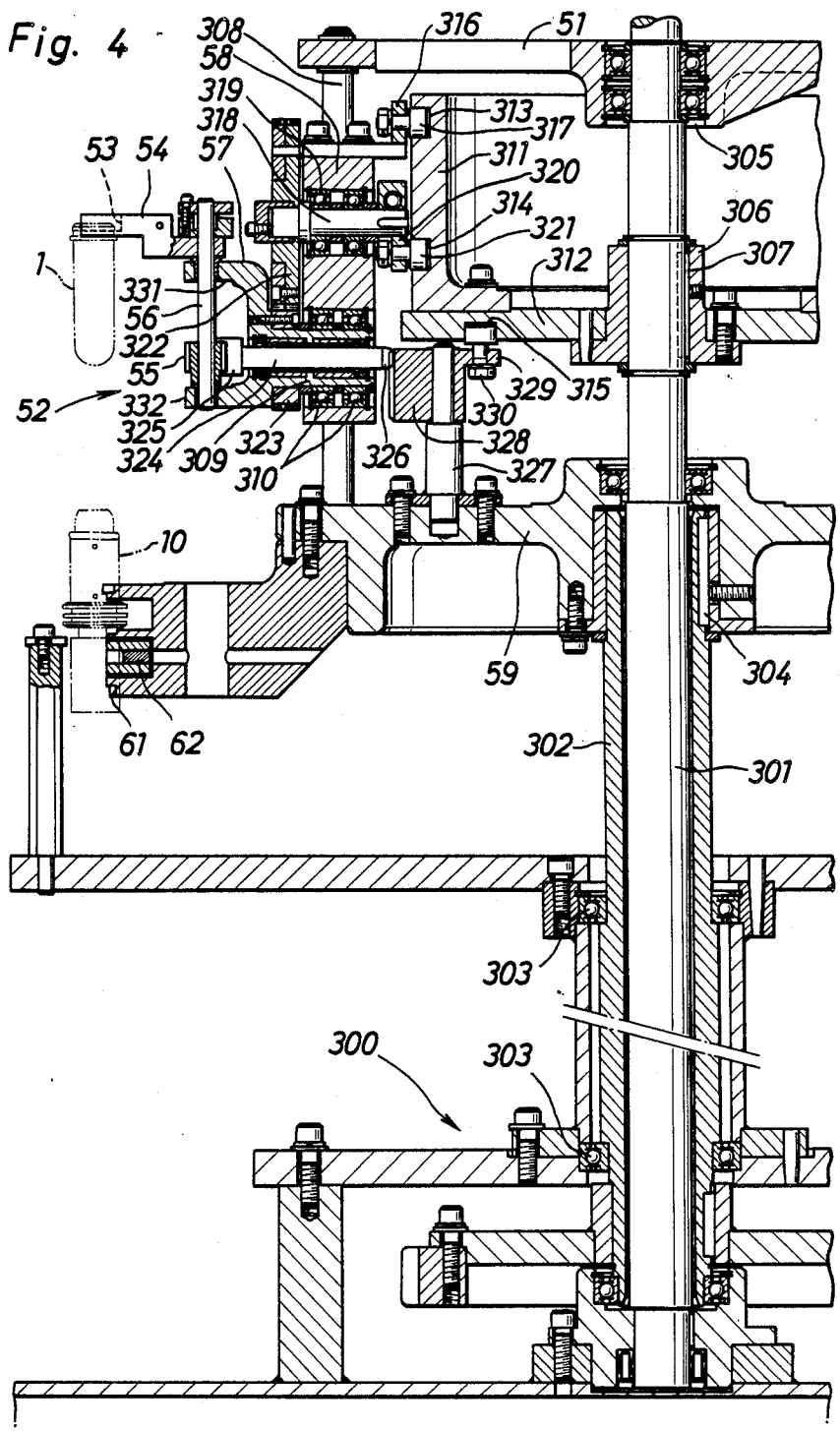
FIG. 4 is a sectional side view illustrating in detail drive mechanisms of the loading and unloading mechanism.

Referring to FIG. 4 illustrating in detail the driving system for the loading and unloading mechanism 50, a central shaft 301 is unrotatably fixed to a machine stand 300, and a hollow driving shaft 302 is arranged coaxially with the central shaft 301 so that it can rotate through a bearing 303. The second rotary member 59 is secured to the top end of the hollow driving shaft 302 by a key 304. The unrotatable central shaft 301 extends upward beyond the top end of the hollow driving shaft 302, and the first rotary member 51 is rotatably pivoted on the top end portion of the central shaft 301 through a bearing 305. A cam plate-supporting boss 306 is unrotatably secured to an intermediate part of the central shaft 301 through a key 307. The first rotary member 51 is integrally connected to the second rotary member 59 through a vertical shaft 308 attached to the periphery of the first rotary member 51. It will be understood that both of the first rotary member 51 and the second rotary member 59 are rotated with the rotation of the driving shaft 302.

The lift member 58 is arranged so that the slide member 58 can slide along the vertical shaft 308, and the bracket 57 is attached to the lower part of the lift member 58 in the following manner. One end of the bracket 57 is bifurcate and the gripper-driving shaft 56 is rotatably supported on this bifurcate end of the bracket 57. The other end portion of the bracket 57 is formed into a hollow shaft 309 and is supported on the lift member 57 rotatably through a bearing 310.

A cylindrical cam plate 311 and a horizontal cam plate 312 are fixed to the cam plate-supporting boss 306, and a cam 313 for controlling the vertical movement of the clamping mechanism and a cam 314 for controlling the rotation (turning-over movement) of the clamping mechanism are arranged on the cylindrical cam plate 311 and a cam 315 for controlling the opening and closing movement of the grippers is arranged on the horizontal cam plate 312.

An angle 316 is attached to the lift member 58 and a cam follower 317 to be engaged with the vertical movement-controlling cam 313 is arranged on the angle 316. It will be understood that the lift member 58 is rotated with the vertical movement of the cam follower 317 and sequentially, the clamping mechanism as a whole is vertically moved A shaft 318 is arranged at the central part of the lift member 58 rotatably through a bearing 319 and a swinging arm 320 is attached to one end of the shaft 318, and a cam follower 321 to be engaged with the cam 314 for controlling the rotation of the clamping mechanism is arranged on one end of the arm 320. A gear 322 is secured to the other end of the shaft 318 and this gear 322 is engaged with a gear 323 secured to the hollow shaft 309 of the bracket 57. Accordingly, it will be understood that when the cam follower 321 for controlling the rotation of the clamping mechanism is vertically moved, the arm 320 is swung, and the shaft 316 and, in turn, the gear 322 are rotated, with the result that the rotation is transmitted to the bracket 57 through the gear 323 to cause the rotation of the clamping mechanism.

A slide shaft 324 is arranged at the center of the bracket-supporting hollow shaft 309 arranged in the lower portion of the lift member 58 so that the slide shaft 324 can slide through a rack 325 which is arranged on the outer end portion of the slide shaft 324 and is engaged with the pinion 55 secured to the gripper-driving shaft 56. Another rack 326 is arranged on the inner end portion of the slide shaft 324, and this rack 326 is engaged with a fan-shaped pinion 328 rotatably supported on the upper end of an implanted shaft 327 of the second rotary member 59. This fan-shaped pinion 328 has an arm 329 and a cam follower 330 to be engaged with the cam 315 for controlling the opening and closing of the grippers is supported on this arm 329. When this cam follower 330 is moved in the radial direction of the rotary member, the fan-shaped pinion 328 is rotated to cause the movement of the slide shaft 324 and the rack 325 in the radial direction of the rotary member, with the result that the pinion 55 is rotated to open or close the grippers 54.

In the bifurcate bracket 57, it is preferred that the diameter of the portion 331 supporting the grippers 54 be larger than the diameter of the opposite portion 332. In this preferred embodiment, the distance of the downward movement for insertion of the preform 1 into the mandrel 10 after the reversion of the preform 1 can be shortened.

Figure 5:
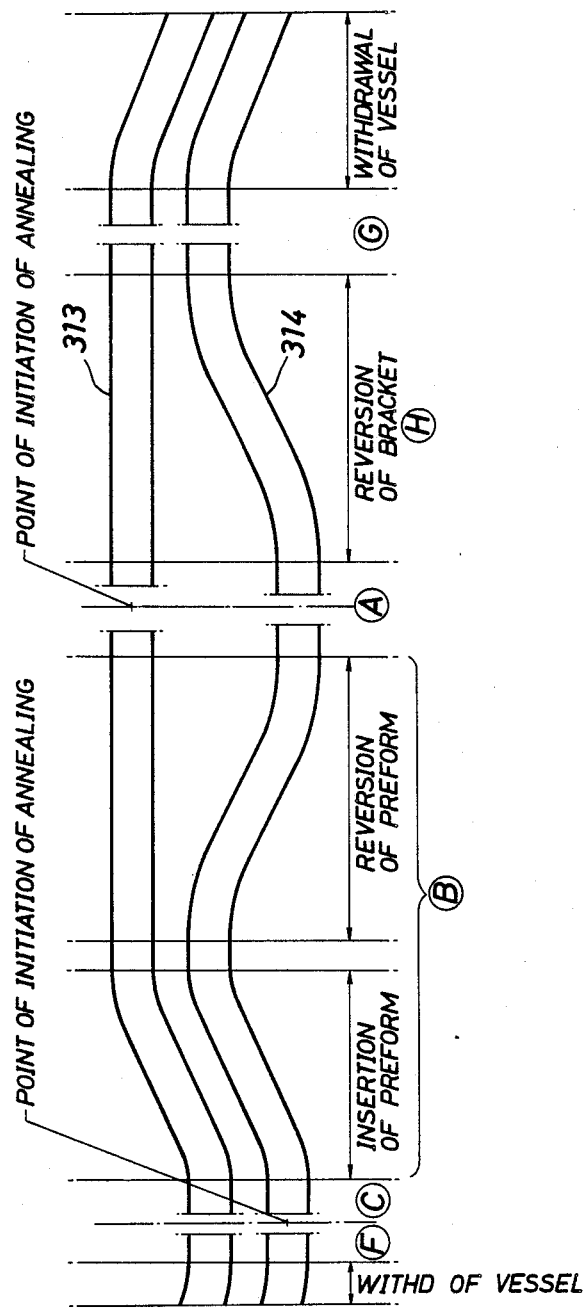
FIG. 5 is a development view showing, in the developed state, a cam for controlling the vertical movement and a cam for controlling the rotary movement in FIG. 4.

FIG. 5 is a development diagram of the cylindrical cam plate 311, which illustrates the loci of the cam 313 for controlling the vertical movement of the clamping mechanism and the cam 314 for controlling the rotation of the clamping mechanism. As is seen from FIG. 5, while the distance between the cam 313 and the cam 314 is constant, the rotation of the bracket 57 is not caused, and as this distance is changed, the rotation of the bracket 57 is caused. Incidentally, the alphabetical symbols correspond to the stations shown in FIG. 2-A.

FIG. 2-A shows eight states A through H of the clamping mechanism 58. The station A corresponds to the position for holding the preform coming from the large turret 33, and at this position, the mandrel 10 is fixed to the mandrel-supporting recess 61 by the magnet 62. The grippers 54 are driven by the pinion 55 and the like so that they are closed, and the neck portion 2 of the preform 1 is held by the notches 53. In this state, the lift member 58 is located at the rise position and the glippers 54 are located at the highest position.

As the clamping mechanism 52 shifts to the station B from the station A, the clockwise rotation of the bracket 57 is initiated by the cams 314 and 321 and the like, and sequentially, the rotation of the clamped preform 1 is initiated. The station B shown in FIG. 2-A corresponds to the state where the preform 1 is rotated by about 90°. While the clamping mechanism 52 moves to the station C from the station B, the bracket 57 continues to rotate, and the rotation is stopped in the state where the preform 1 is rotated by 180°, that is, the preform 1 is turned over. Then, the bracket 57 is brought down together with the lift member 58 by the cam mechanism (313, 317) and the turned-over preform 1 is pushed into the mandrel 10 located on the same vertical axis as that of the preform 1, whereby, as shown in FIG. 2-C, the insertion top end portion 11 of the mandrel 10 is pushed into the neck portion of the preform 1 to fix the preform 1 to the mandrel 10. Thus, the clamping mechanism 52 arrives at the station C.

At the station C, the preform-loaded mandrel is transferred to the preform delivery mechanism 70 (see FIG. 1). The grippers 54 are opened by the pinion 55 to release the preform 1. At this station C, the mandrel-supporting portion 71 of the delivery mechanism provided with a magnet is brought close to the preform-loaded mandrel 10 and the attracting force by the magnet acts on the mandrel 10. A mandrel-separating guide 63 is arranged on the side of the advance direction of the mandrel 10 to deliver the mandrel 10 to the preform delivery mechanism 70 from the loading and unloading mechanism 50. In the station C, the lift member 58 is at the lowest position and also the grippers 54 are located at the lowest position. The operations of the loading and unloading mechanism 50 in the stations subsequent to the station C will be described hereinafter.

In the embodiment illustrated in the accompanying drawings, the movement of the mandrel between the rotary members is accomplished by the combination of the attracting force of the magnet and the separating guide, as described hereinbefore.

The preform-preheating mechanism 100 comprises a driven and rotated turret 101, mandrel-supporting seats 102 arranged at certain intervals on the periphery of the turrent, an infrared radiation heating mechanism 103 arranged along the periphery of the turret and a driving mechanism 104 (see FIG. 6) for rotation of the mandrel.

Figure 6:
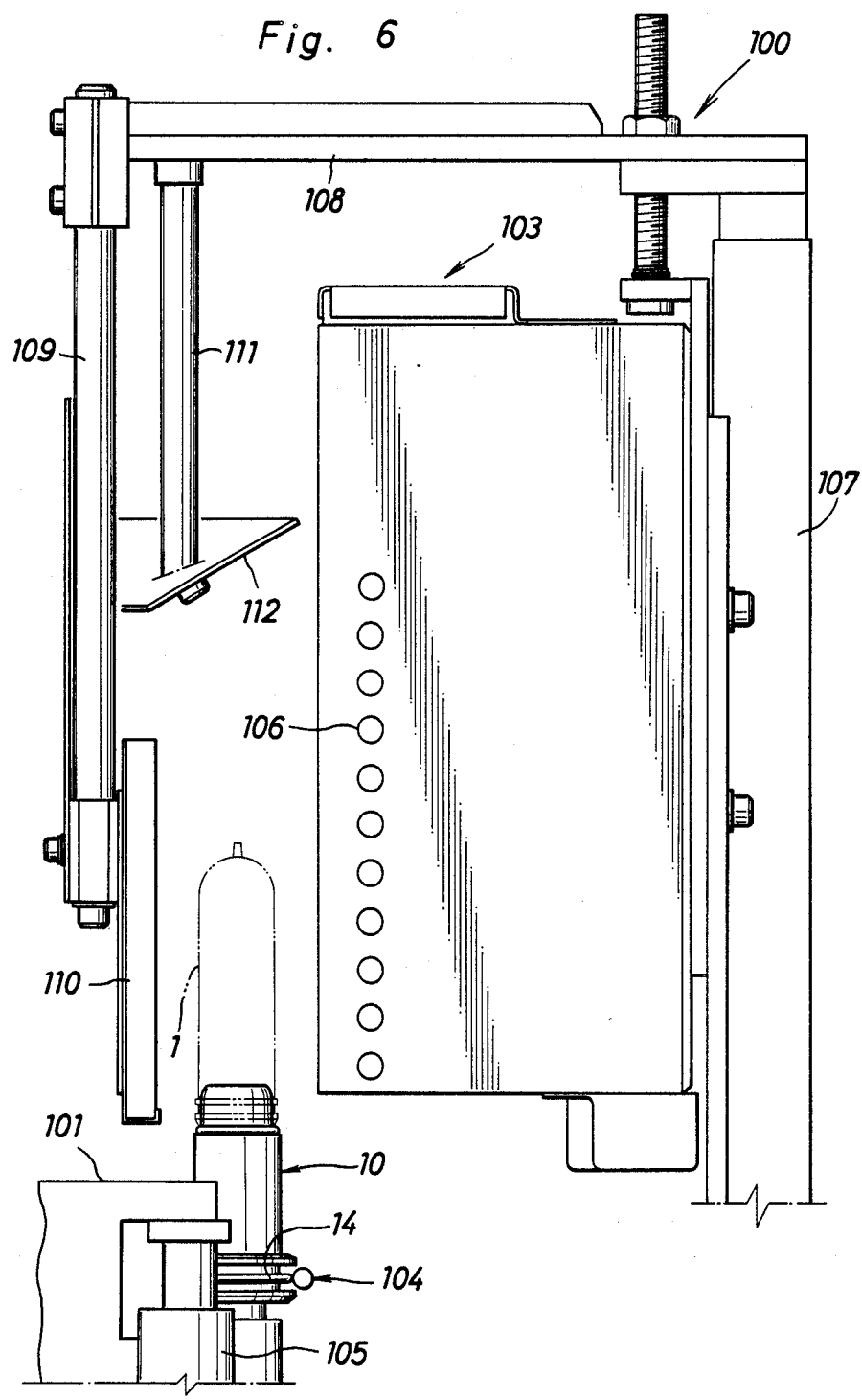
FIG. 6 is an enlarge side view showing the section of a preheating mechanism.

Referring to FIG. 6, which is an enlarged view showing this preheating mechanism, the mandrel 10 carrying the preform 1 thereon is attracted to the mandrel-supporting seat 102 by a magnet (not shown) but it is held rotatably by a roller. The driving mechanism 104 for rotation of the mandrel comprises a chain and is kept engaged with the gear (sprocket) 14 in the region of from the infrared radiation heating mechanism 103a located most upstream to the infrared radiation heating mechanism 103z located most downstream. In this arrangement, by rotation of the turret 101, the preform-loaded mandrel 10 is revolved, and when the driving mechanism 104 is driven, the preform-loaded mandrel 10 is rotated.

The infrared radiation heating mechanism 103 is extended in the circumferential direction and comprises many infrared radiation units 106 arranged at small intervals in the vertical direction. A row of the infrared radiation units 106 are attached to a machine frame 107 in such a positional relation that the infrared radiation units 106 confront the cylindrical barrel and bottom of the preform 1 Although the infrared radiation units 106 are located on the outer peripheral side of the row of the preforms 1, an infrared ray-shielding plate 110 is arranged on the inner circumferential side of the row of the preforms 1 through supporting members 108 and 109. Above the bottom of the preform, an infrared ray-reflecting plate 112 is arranged through a supporting member 111. Accordingly, the preheating of the preform 1 to a drawing temperature can be performed efficiently.

The preform-loaded mandrel 10 is transferred to the mandrel-supporting seat 102 of the preheating mechanism 100 from the delivery mechanism 70. While the preform 1 is moved along the infrared radiation units 106, the preform 1 is rotated and preheated at a predetermined temperature. Since infrared radiation heating is effected mainly on the outer surface of the preform 1, there is formed such a temperature gradient that the temperature of the outer surface of the preform 1 is relatively high and the inner surface of the preform 1 is relatively low. Turrets 170 and 180 are arranged to eliminate this temperature gradient and uniformalize the temperatures of the inner and outer surfaces of the preform.

The first temperature-uniformalizing turret 170 is provided with a mandrel-supporting seat 171 and the second temperature-uniformalizing turret 180 is provided with a mandrel-supporting seat 181. The mandrel carrying thereon the preform heated at a predetermined temperature by the preheating mechanism 100 is delivered to the supporting seat 171 of the first turret 170, and after the preform is allowed to stand still for a predetermined time, the preform is delivered to the supporting seat 181 of the second turret 160 and is further allowed to stand still for a predetermined time. By this treatment, the temperature of the inner surface is gradually elevated by conduction of heat from the outer surface while the outer surface of the preform 1 is gradually cooled, with the result that both of the temperatures of the inner and outer surfaces become substantially equal to each other. The preform carrying thereon the temperature-uniformalized preform is delivered to the mandrel-supporting portion 64 of the transfer mechanism 60 from the mandrel-supporting seat 181 of the second turret 180 and is then supplied to the forming mechanism 200.

The forming mechanism 200 comprises a rotary member 201, an openable and closable split mold 202 arranged around the rotary member rotatably together with the rotary member and a mold-closing and mold-opening member 203 (see FIG. 7) corresponding to the mold. In a circular movement path of the mold, a preform-loaded mandrel-supplying zone I, a draw-blow-forming zone J and a vessel-loaded mandrel-withdrawing zone K are arranged in the recited order, and in the draw-blow-forming zone J, the mold 202 is closed while the mold 202 is opened in the other zones.

Figure 7:
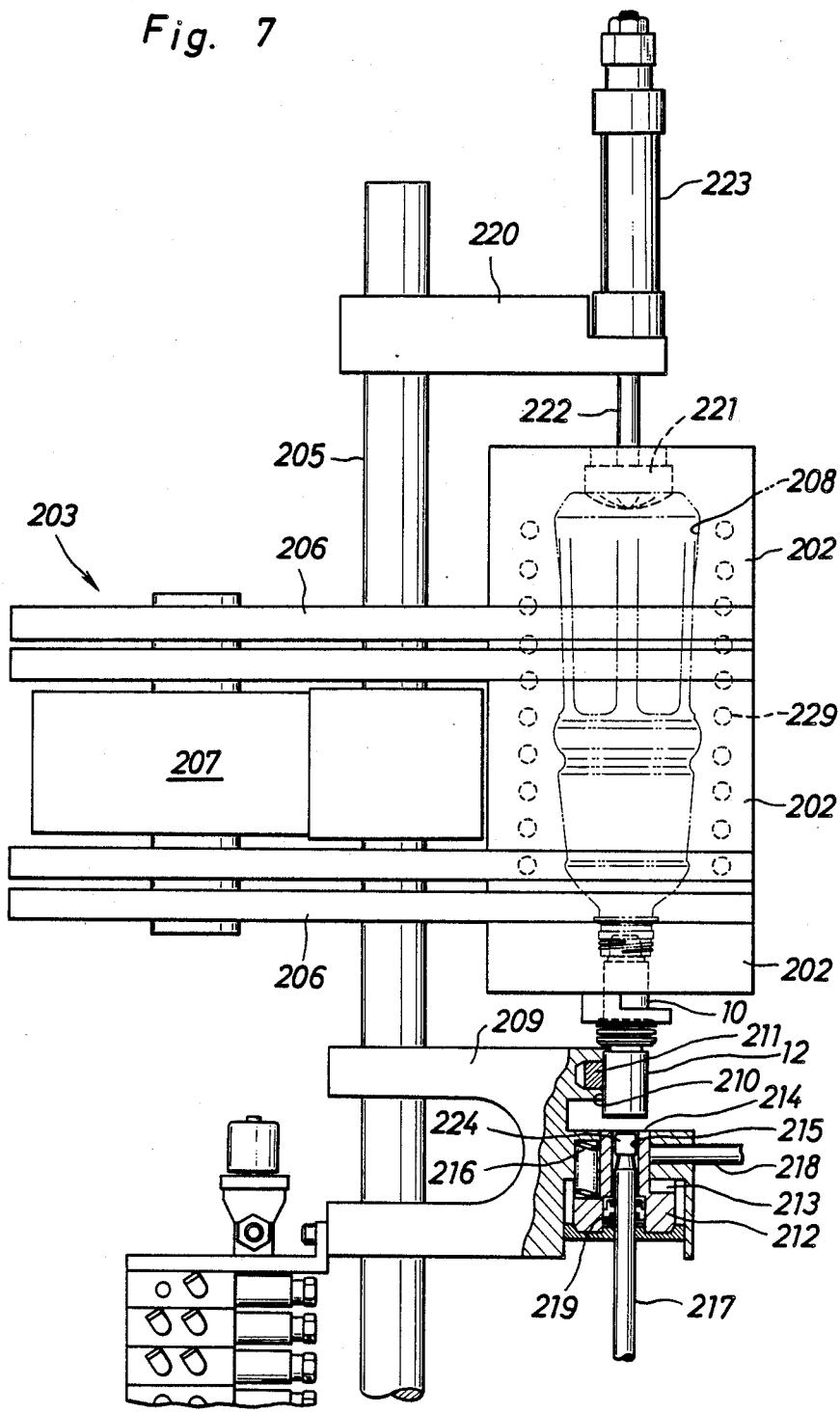
FIG. 7 is an enlarged side view illustrating a forming mechanism.

Referring to FIG. 7 illustrating the forming mechanism 200 in detail, a mold-opening and mold-closing arm 206 is radially arranged on the rotary member and a vertical shaft 205 is secured to a supporting portion thereof. A mold-opening and mold-closing arm 206 is arranged so that the arm 206 can swing in the horizontal direction with the vertical shaft 205 being as the center, and the mold 202 is attached to one end portion of the arm 206 and a fluid pressure cylinder 207 is arranged on the other end portion of the arm 206 to open and close the mold 202. The mold 202 has a cavity 208 having a size and shape corresponding to those of the final vessel supported on the mandrel.

A mandrel-supporting bracket 209 is secured to the lower portion of the vertical shaft 205. A mandrel-supporting seat 210 is formed at the upper part of the top end portion of the bracket 209, and a magnet 211 is arranged on the supporting seat 210 to hold the shaft portion 12 of the mandrel 10. A housing portion 213 for supporting a lift member 212 for the blow-forming operation movably in the vertical direction is formed at the lower part of the top end portion of the bracket 209. The lift member 212 for the blow-forming operation has a sealing surface 214 to be sealed and engaged with the lower end face of the mandrel 10 and the lift member 212 has in the interior thereof a path 215 extending in the vertical direction. The lift member 212 for the blow-forming operation is normally urged downward by a pressing spring 216, and the lift member 212 is raised up by the operation of an electro-magnetic valve 245 shown in FIG. 9. A drawing rod 217 is vertically movably arranged in the path 215 of the lift member 212 for the blow-forming operation. The vertical movement of the drawing rod 217 is performed by the operation of an electromagnetic valve 248.

A clearance acting as a gas passage is formed between the path 215 of the lift member 212 for the blow-forming operation and the drawing rod 217, and this passage is connected to a gas source through a path 218. A seal 219 is formed to effect sealing between the drawing rod 217 and the lift member 212 for the blow-forming operation.

A bottom mold 221 is supported on the upper portion of the vertical shaft 205 so that the bottom mold 221 can be moved in the vertical direction by a lift shaft 222. The lift shaft 222 is driven by a fluid cylinder 223 for the vertical movement of the bottom mold, which is arranged on a supporting member 220.

In the state where the split mold 202 is closed, the center of the cavity 208, the center of the bottom mold 221, the of the mandrel 10 supported on the supporting seat 210, the center of the lift member 212 for the blow-forming operation and the center of the drawing rod 217 are registered with one another on one vertical axis. The drawing rod 217 has an engagement top end portion 224 The drawing rod 217 is inserted into the preform 1 through the interior of the path 15 of the mandrel 10 and the engagement top end portion 224 of the drawing rod 217 is engaged with the inner wall of the bottom portion of the preform 1 to draw the preform 1 in the axial direction.

Figure 8:
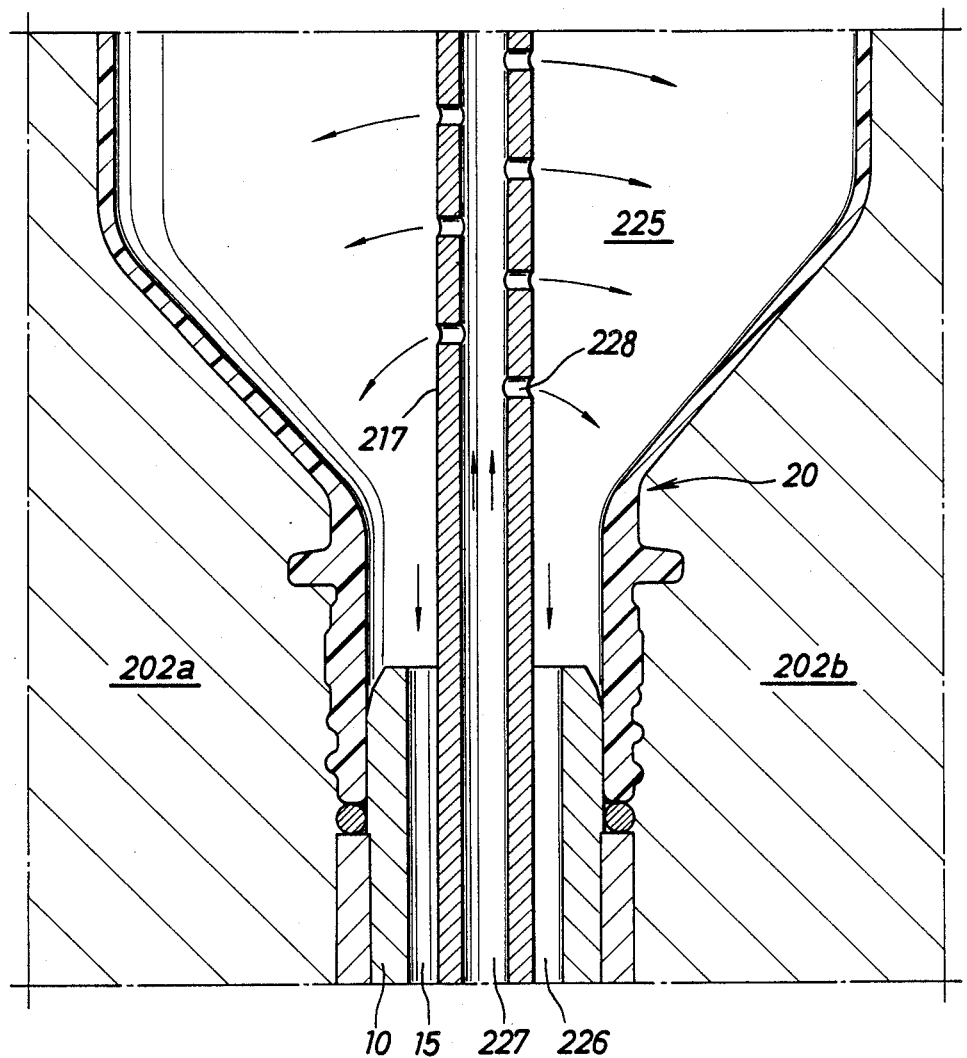
FIG. 8 is an enlarged sectional view illustrating the sectional structure of a drawing rod relatively to the mandrel.

Referring to FIG. 8 illustrating the sectional structure of the drawing rod relatively to the mandrel, a first gas path 226 is formed on the periphery of the drawing rod 217 so that the path 226 communicates with an internal space 225 of the preform or vessel in the path 15 of the mandrel 10. The first gas path 226 is connected to the path 218 through the path 215 of the lift member. The drawing rod 217 is hollow and a second gas path 227 is formed in the drawing rod 217. This second gas path 227 communicates with the internal space of the preform or vessel through an opening 228 distributed in the length direction of the drawing rod. The first gas path 226 is connected to a high-pressure air supply mechanism and an air discharge mechanism (described in detail hereinafter) through an openable and closable change-over valve, and the second gas path 227 is connected to a cooling air supply mechanism through an openable and closable valve. A cooling mechanism 229 may be disposed in the mold 202.

Figure 9:
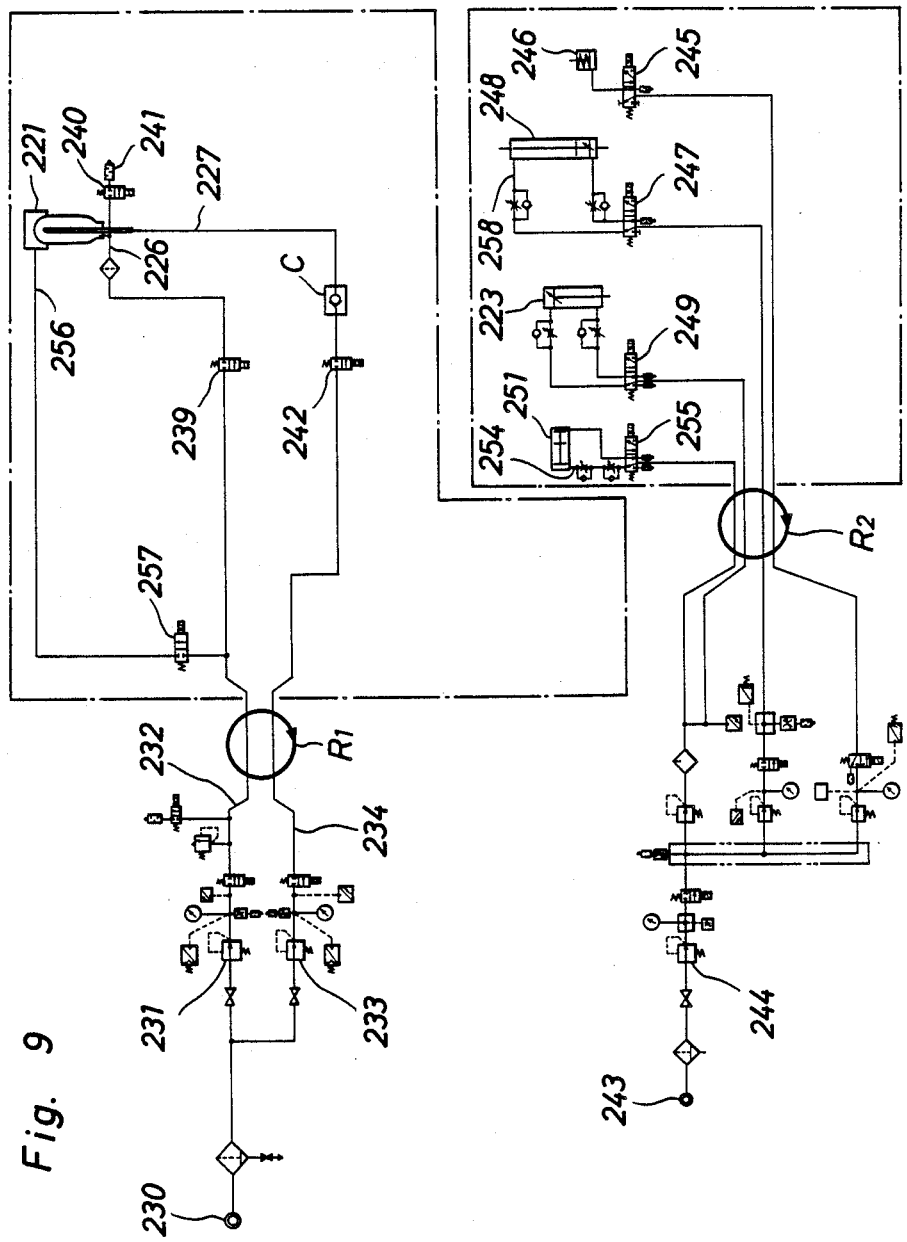
FIG. 9 is a systematic view illustrating a control mechanism of a draw-blow-forming and heat-setting mechanism.

In FIG. 9 illustrating the control mechanism for the blow-forming mechanism 200, B represents an electromagnetic valve, C represents a check valve, R represents a rotary joint and S represents a throttle valve. A high-pressure air source 230 (for example, 40 kg/cm² at highest) is divided into a relatively high-pressure blowing air source 232 through a pressure-reducing valve 231 and a relatively low-pressure cooling air source 234 through a pressure-reducing valve 234. The high-pressure blowing air source 232 is connected to the first gas path 226 through a blowing electromagnetic valve 239, and moreover, the first gas path 226 is connected to an exhaust opening 241 through a gas-discharging electromagnetic valve 240.

The relatively low-pressure cooling air source 234 is connected to the second gas path 227 through a cooling electro-magnetic valve 242.

Separately from the high-pressure air source, a low-pressure air source 243 is arranged for driving the respective fluid cylinders and is connected to the respective fluid cylinders through a pressure-adjusting valve 244 and a rotary joint R₂. More specifically, the low-pressure air source 243 is connected to a cylinder 246 for vertically moving the lift member for the blowing operation through a mandrel-sealing electromagnetic valve 245 and to a cylinder 248 for vertically moving the drawing and through a drawing electromagnetic valve 247, and also to a cylinder 223 for vertically moving the bottom mold through an electromagnetic valve 249 for the bottom mold.

Moreover, the cylinder-driving low-pressure air source 243 is connected to a mold-opening and mold-closing cylinder 251 through an opening and closing electromagnetic valve 255.

In order to facilitate parting of the formed vessel from the bottom mold 221, an air-blowing pipe 256 is arranged in the bottom mold 221, and this pipe 256 is connected to the high-pressure blowing air source 232 through a mold-parting electromagnetic valve 257.

The blow-forming operation is carried out according to the following procedures.

(1) Supply

In the station I shown in FIG. 1, the mold 202 is in the opened state, and the bottom mold 221 is located at the brought-down position and also the lift member for the blow-forming operation is located at the brought-down position. The mandrel 10 carrying thereon the preform preheated at a drawing temperature is held on the mandrel-supporting seat 210.

(2) Preparation for Blow-Forming Operation

The mold-opening and mold-closing electromagnetic valve 255 is switched to drive the mold-opening and mold-closing cylinder into the closing stroke and close the mold 202. Then, the mandrel-sealing electro-magnetic valve 245 is switched to cause the cylinder 246 for the vertical movement to elevate the lift member 212 for the blow forming operation, whereby sealing with the mandrel 10 is maintained.

(3) Blow-Forming Operation

In the station J shown in FIG. 1, the drawing electromagnetic valve 247 is switched to elevate the cylinder 248, and the drawing rod 217 is elevated to draw the preform 1 in the axial direction.

Simultaneously, the electromagnetic valve 239 is switched and the blow-forming high-pressure air is blown into the preform through the first path 226 to effect expansion drawing of the preform in the cicumferential direction.

(4) Withdrawal

The formed vessel is withdrawn from the mold in the station K shown in FIG. 1. At first, the electro-magnetic valve 240 is opened to release air in the interior of the vessel. The vessel-cooling electro-magnetic valve 242 is closed, and then, the mandrel-sealing electromagnetic valve is switched and the blow-forming member 212 is returned to the brought-down position by the spring 216 (see FIG. 7). Immediately thereafter, the mold-opening and mold-closing electromagnetic valve 255 and the drawing electromagnetic valve 247 are switched, and the cylinder 251 is actuated to open the mold and the cylinder 248 is actuated to bring down the drawing rod 217 and stop it at the position shown in FIG. 7.

The electromagnetic valve 249 for the bottom mold is switched to actuate the cylinder 223 to elevate the bottom mold 221. Simultaneously, the mold-parting electromagnetic valve 257 is switched and the high-pressure air is blown to the bottom of the vessel to perform the mold-parting operation smoothly.

In the withdrawal zone K shown in FIG. 1, the mandrel 10 carrying thereon the drawn vessel 20 is transferred onto the vessel withdrawal mechanism 80 and supplied to the loading and unloading mechanism 50.

Referring to FIG. 2-A again the clamping mechanism 52 holding the grippers 54 in the opened state in the station C passes through the stations D and E and arrives at the station F for receiving the vessel-loaded mandrel. Namely, the lift member 58 and grippers 54 are in the same state as in the station C. In the station F, the vessel-loaded mandrel 10 is supported on the mandrel-supporting recess. The grippers 54 are closed and the neck portion of the vessel 20 is held by the notches 53. As the mandrel moves to the station G from the station F, the lift member 58 and, in turn, the clamping mechanism 52 are elevated, and the vessel 20 is withdrawn from the mandrel 10. In the station G, the lift member 58 is located at the elevated position, but the grippers 54 are located at the relatively low position, that is, at the reversal position.

In the embodiment shown in FIG. 1, the delivery mechanism 40 for the vessel 20 comprises a vessel-reversing mechanism 41 and a vessel-carrying mechanism 42. The vessel-reversing mechanism 41 is for setting upright the turned-over vessel and has the same structure as that of the clamping mechanism shown in FIG. 2-A except that the mandrel-supporting mechanism is not disposed.

Figure 10:
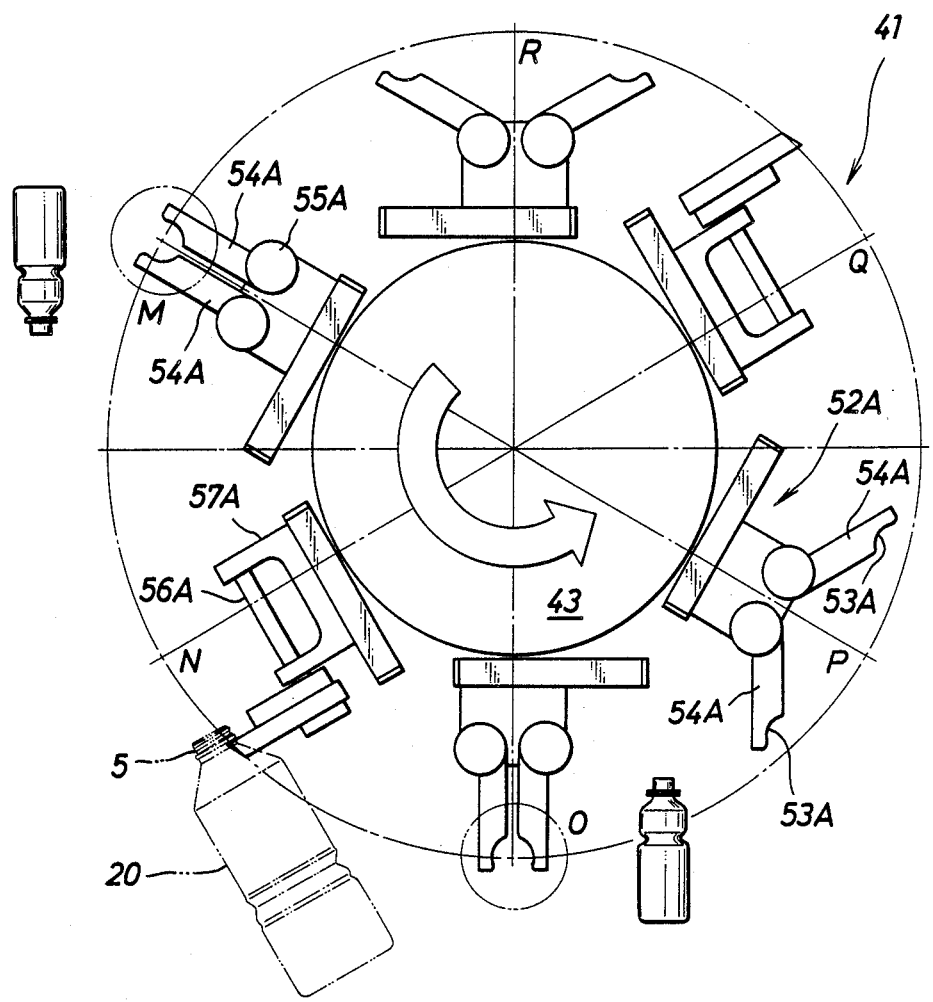
FIG. 10 is an enlarged top view illustrating a vessel-reversing mechanism.

Referring to FIG. 10 illustrating this vessel-reversing mechanism, the rotary member 43 has on the periphery thereof many clamping mechanisms 52A and the respective members of each clamping mechanism 52A are represented by referential numerals of the corresponding members shown in FIG. 2-A while adding affix A. The vessel-reversing mechanism 41 has six stations M through R. The station M is the vessel-clamping position corresponding to the station G of the loading and unloading mechanism 50. Namely, in the state of the station G of the loading and unloading mechanism 50 where the grippers 54 are still closed, the grippers 54A are closed to hold the lower part of the supporting ring 5 of the vessel 20. Then, the grippers 54 of the loading and unloading mechanism 50 are opened, and the vessel 50 is transferred onto the reversing mechanism 41.

In the station M of the reversing mechanism 41, the vessel 20 is in the turned-over state, and then, with the counterclockwise rotation of the reversing mechanism 41, the bracket 57A begins to rotate clockwise. In the station N, the vessel 20 is in the state where the vessel 20 is rotated by about 90°, and in the station O, the vessel 20 is in the state where the vessel 20 is rotated by 180°, that is, the vessel 20 is set upright. In this station A, the grippers 54A are opened and the vessel 20 is discharged onto a conveyor 42, and the vessel 20 is fed to the inspecting and packaging zones. While the clamping mechanism 52A passes through the stations P, Q and R, the clamping mechanism 52A is further rotated by 180° and arrived at the station M.

On the other hand, while the clamping mechanism in the loading and unloading mechanism 50 moves from the station G to the station A, the clamping mechanism is turned over by 180° to restore the state capable of clamping the preform.

As is apparent from the foregoing description, according to the present invention, by adopting the above-mentioned structure in an apparatus for preparing a hollow vessel by the draw-blow-forming operation while delivering mandrels supporting thereon preforms and vessels through a preform-heating zone and a draw-blow-forming zone by an endless conveyor system, insertion and fixation of the preforms into the mandrels and withdrawal of vessels from the mandrels can be performed continuously, assuredly and smoothly in one apparatus. Namely, the downward movement of the clamping mechanism is utilized for insertion of the preforms and the rising movement of the clamping mechanism is utilized for withdrawal of the vessel, whereby the waste in the vessel-forming operation can be saved. Moreover, if the operation of reversing the clamping mechanism is added, any particular device need not be disposed for reversing the preforms.

We claim:

1. A delivery apparatus in a machine for preparing drawn plastic hollow vessels, said delivery apparatus comprising:
   (A) a mandrel for supporting a preform composed of a plastic material and a hollow vessel formed from the preform;
   (B) a loading means for loading the preform on the mandrel;
   (C) a preheating means having a rotary turret comprising a plurality of supporting seats for supporting the mandrel on the periphery thereof and a heating mechanism arranged along the periphery of the turret to heat the preform loaded on the mandrel;
   (D) a blow-forming means comprising a rotary member having, arranged along the periphery thereof, a plurality of openable and closable blow-forming molds and mandrel-supporting members corresponding to said molds;
   (E) a delivery means for delivering the preheated preform-loaded mandrel to the blow-forming means from the preheating means; and
   (F) a withdrawal means for withdrawing the blow-formed vessel-loaded mandrel from the blow-forming means;
   wherein said loading means comprises:
   (1) a preform supply mechanism for supplying the preform;
   (2) a unitary preform-loading and vessel-unloading mechanism for pushing the preform coming from the supply mechanism onto the mandrel to fix the preform thereto and withdrawing the vessel from the vessel-loaded mandrel supplied from the withdrawal means;
   a preform delivery mechanism for delivering the preform-loaded mandrel to the preheating means; and
   (4) a vessel delivery mechanism for delivering the vessel withdrawn from the mandrel to the outside of the apparatus from the loading and unloading mechanism; wherein said preform-loading and vessel-unloading mechanism comprises:
   (a) a first rotary member,
   (b) a clamping mechanism having grippers arranged equidistantly along the periphery of said first rotary member to hold the neck portions of the preform and vessel,
   (c) an opening and closing drive mechanism for opening and closing the grippers of the clamping mechanism,
   (d) a reciprocating drive mechanism for driving the clamping mechainsm reciprocatively in the axial direction of said first rotary member,
   (e) a second rotary member arranged coaxially with said first rotary member below said first rotary member and spaced therefrom in the axial direction, and
   (f) mandrel supporting seats arranged equidistantly along the periphery of the second rotary members and located at positions coaxial with the positions for gripping the neck portions of the preform and vessel in the clamping mechanism;

said preform supply mechainsm, said preform delivery mechanism, said vessel withdrawal means and the vessel delivery mechanism being arranged in the recited order in the rotation direction of the first and second rotary member along the periphery of the preform-loading and vessel-unloading mechanism; and said opening and closing drive mechanism and said reciprocating drive mechanism for the clamping mechanism being timed with each other so that motions (i) and (vi) occur in operation;

(i) the grippers close to hold the preform from the preform supply mechanism, (ii) the grippers move downwardly to insert the preform onto the mandrel, (iii) the grippers open to release the preform to the preform delivery mechanism, (iv) the grippers close to hold the neck portions of the vessel from the vessel withdrawal means, (v) the grippers move upwardly to withdraw the vessel from the mandrel, and (vi) the grippers open to release the vessel to the vessel delivery mechanism.

2. A delivery mechanism as set forth in claim 1, wherein said vessel delivery mechanism comprises:

(A) a vessel-reversing mechanism, and (B) a vessel-conveying mechanism; said vessel-reversing mechanism comprising:

(1) a second rotary member, (2) a second clamping mechanism having second grippers arranged equidistantly along the periphery of the second rotary member to hold the lower part of the neck portion of the vessel, (3) a second opening and closing mechanism for opening and closing the second grippers of said second clamping mechanism, and (4) a second rotating drive mechanism for rotating and driving said second clamping mechanism at the position for the attachment to the rotary member; and the opening and closing mechanism and the rotating drive mechanism being combined with each other so that:

(a) the second grippers close to hold the lower part of the neck portion of the vessel from said loading and unloading mechanism, (b) the second clamping mechanism rotates in a ½ to ¼ circle for an upright setting or side long laying of the vessel, and (c) the second grippers open to release the vessel to said vessel-conveying mechanism.

3. A delivery apparatus as set forth in claim 1, wherein said preform-loading and vessel-unloading mechanism further comprises:

(A) a rotating drive mechanism for rotating and driving the clamping mechanism at the position for the attachment to the rotary member, (B) said rotary drive mechanism being combined with said opening and closing drive mechanism and said reciprocating drive mechanism so that:

(1) the clamping mechanism rotates in a half circle between said motion (i) and said motion (ii), and (2) the clamping mechanism rotates in another half circle between said motion (vi) and said motion (i).

* * * * *